(12) United States Patent
Scott et al.

(10) Patent No.: US 8,959,109 B2
(45) Date of Patent: Feb. 17, 2015

(54) BUSINESS INTELLIGENT IN-DOCUMENT SUGGESTIONS

(75) Inventors: Matthew Robert Scott, Beijing (CN); Chao Wang, Beijing (CN); Richard J. Sgro, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 91 days.

(21) Appl. No.: 13/567,305

(22) Filed: Aug. 6, 2012

(65) Prior Publication Data

US 2014/0040238 A1 Feb. 6, 2014

(51) Int. Cl.
*G06F 7/00* (2006.01)
*G06F 17/30* (2006.01)

(52) U.S. Cl.
USPC .......................................... 707/769

(58) Field of Classification Search
None
See application file for complete search history.

(56) References Cited

U.S. PATENT DOCUMENTS

| | | | |
|---|---|---|---|
| 4,559,604 A | 12/1985 | Ichikawa et al. |
| 5,796,866 A | 8/1998 | Sakurai et al. |
| 5,873,107 A | 2/1999 | Borovoy et al. |
| 5,987,415 A | 11/1999 | Breese et al. |
| 5,995,928 A | 11/1999 | Nguyen et al. |
| 6,076,056 A | 6/2000 | Huang et al. |
| 6,085,160 A | 7/2000 | D'hoore et al. |
| 6,092,044 A | 7/2000 | Baker et al. |
| 6,236,964 B1 | 5/2001 | Tamura et al. |
| 6,247,043 B1 | 6/2001 | Bates et al. |
| 6,363,342 B2 | 3/2002 | Shaw et al. |
| 6,377,965 B1 | 4/2002 | Hachamovitch et al. |
| 6,408,266 B1 | 6/2002 | Oon |
| 6,731,307 B1 | 5/2004 | Strubbe et al. |
| 6,732,074 B1 | 5/2004 | Kuroda |
| 6,801,893 B1 | 10/2004 | Backfried et al. |
| 6,941,267 B2 | 9/2005 | Matsumoto |
| 6,963,841 B2 | 11/2005 | Handal et al. |
| 7,069,254 B2 | 6/2006 | Foulger et al. |
| 7,107,204 B1 | 9/2006 | Liu et al. |
| 7,165,032 B2 | 1/2007 | Bellegarda |
| 7,194,538 B1 | 3/2007 | Rabe et al. |
| 7,224,346 B2 | 5/2007 | Sheng |
| 7,277,029 B2 | 10/2007 | Thiesson et al. |

(Continued)

FOREIGN PATENT DOCUMENTS

CN 1851617 10/2006

OTHER PUBLICATIONS

U.S. Appl. No. 12/960,258, filed Dec. 3, 2010, Wei, et al., "Wild Card Auto Completion," 74 pages.

(Continued)

*Primary Examiner* — Uyen Le
(74) *Attorney, Agent, or Firm* — Dan Choi; Judy Yee; Micky Minhas

(57) ABSTRACT

Implementing business intelligent in-document suggestion may include detecting a content that a user is inputting into a document or selecting from the document. Based on the content, a key word may be extracted to generate a query. The query may be transmitted to an enterprise search engine for enterprise intelligence. Based on returned search results, a suggestion may be generated and presented to a user device by integrating the suggestion into the document. In some embodiments, the suggestion may include a people suggestion, a document suggestion, a phrase suggestion and a document template suggestion. In some embodiments, adding an additional content or selecting a subset of the content may refine the suggestion.

20 Claims, 8 Drawing Sheets

(56) References Cited

U.S. PATENT DOCUMENTS

| | | | |
|---|---|---|---|
| 7,308,439 B2 | 12/2007 | Baird et al. | |
| 7,370,275 B2 | 5/2008 | Haluptzok et al. | |
| 7,389,223 B2 | 6/2008 | Atkin et al. | |
| 7,447,627 B2 | 11/2008 | Jessee et al. | |
| 7,451,152 B2 | 11/2008 | Kraft et al. | |
| 7,490,033 B2 | 2/2009 | Chen et al. | |
| 7,505,954 B2 | 3/2009 | Heidloff et al. | |
| 7,512,904 B2 | 3/2009 | Matthews et al. | |
| 7,555,713 B2 | 6/2009 | Yang | |
| 7,562,082 B2 | 7/2009 | Zhou | |
| 7,565,157 B1 | 7/2009 | Ortega et al. | |
| 7,599,915 B2 | 10/2009 | Hill et al. | |
| 7,676,517 B2 | 3/2010 | Hurst-Hiller et al. | |
| 7,689,412 B2 | 3/2010 | Wu et al. | |
| 7,725,318 B2 | 5/2010 | Gavalda et al. | |
| 7,728,735 B2 | 6/2010 | Aaron et al. | |
| 7,752,034 B2 | 7/2010 | Brockett et al. | |
| 7,917,355 B2 | 3/2011 | Wu et al. | |
| 7,917,488 B2 | 3/2011 | Niu et al. | |
| 7,953,730 B1 | 5/2011 | Bleckner et al. | |
| 7,957,955 B2 | 6/2011 | Christie et al. | |
| 7,957,969 B2 | 6/2011 | Alewine et al. | |
| 8,161,073 B2 | 4/2012 | Connor | |
| 8,230,336 B2 | 7/2012 | Morrill | |
| 2002/0005784 A1 | 1/2002 | Balkin et al. | |
| 2002/0188603 A1 | 12/2002 | Baird et al. | |
| 2003/0041147 A1 | 2/2003 | van den Oord et al. | |
| 2003/0160830 A1 | 8/2003 | DeGross | |
| 2004/0220925 A1 | 11/2004 | Liu et al. | |
| 2004/0243415 A1 | 12/2004 | Commarford et al. | |
| 2005/0203738 A1 | 9/2005 | Hwang | |
| 2005/0216253 A1 | 9/2005 | Brockett | |
| 2006/0026147 A1 | 2/2006 | Cone et al. | |
| 2006/0167857 A1 | 7/2006 | Kraft et al. | |
| 2006/0190822 A1 | 8/2006 | Basson et al. | |
| 2006/0206324 A1 | 9/2006 | Skilling et al. | |
| 2006/0242608 A1 | 10/2006 | Garside et al. | |
| 2006/0248074 A1 | 11/2006 | Carmel et al. | |
| 2007/0033269 A1 | 2/2007 | Atkinson et al. | |
| 2007/0052868 A1 | 3/2007 | Chou et al. | |
| 2007/0089125 A1 | 4/2007 | Claassen | |
| 2007/0124132 A1 | 5/2007 | Takeuchi | |
| 2007/0150279 A1 | 6/2007 | Gandhi et al. | |
| 2007/0162281 A1 | 7/2007 | Saitoh et al. | |
| 2007/0192710 A1 | 8/2007 | Platz et al. | |
| 2007/0208738 A1 | 9/2007 | Morgan | |
| 2007/0213983 A1 | 9/2007 | Ramsey | |
| 2007/0214164 A1 | 9/2007 | MacLennan et al. | |
| 2007/0233692 A1 | 10/2007 | Lisa et al. | |
| 2008/0046405 A1 | 2/2008 | Olds et al. | |
| 2008/0189628 A1 | 8/2008 | Liesche et al. | |
| 2008/0195645 A1 | 8/2008 | Lapstun et al. | |
| 2008/0195980 A1 | 8/2008 | Morris | |
| 2008/0208567 A1 | 8/2008 | Brockett et al. | |
| 2008/0221893 A1 | 9/2008 | Kaiser | |
| 2008/0288474 A1 | 11/2008 | Chin et al. | |
| 2008/0312910 A1 | 12/2008 | Zhang | |
| 2009/0002178 A1 | 1/2009 | Guday et al. | |
| 2009/0210214 A1 | 8/2009 | Qian et al. | |
| 2009/0222437 A1 | 9/2009 | Niu et al. | |
| 2010/0122155 A1 | 5/2010 | Monsarrat | |
| 2010/0169770 A1 | 7/2010 | Hong et al. | |
| 2010/0180199 A1 | 7/2010 | Wu et al. | |
| 2010/0217581 A1 | 8/2010 | Hong | |
| 2010/0217795 A1 | 8/2010 | Hong | |
| 2010/0245251 A1 | 9/2010 | Yuan et al. | |
| 2010/0251304 A1 | 9/2010 | Donoghue et al. | |
| 2010/0306139 A1 | 12/2010 | Wu et al. | |
| 2010/0306248 A1* | 12/2010 | Bao et al. | 707/769 |
| 2010/0309137 A1 | 12/2010 | Lee | |
| 2011/0014952 A1 | 1/2011 | Minton | |
| 2011/0060761 A1* | 3/2011 | Fouts | 707/770 |
| 2011/0066431 A1 | 3/2011 | Ju et al. | |
| 2011/0131642 A1 | 6/2011 | Hamura et al. | |
| 2011/0137635 A1 | 6/2011 | Chalabi et al. | |
| 2011/0161080 A1 | 6/2011 | Ballinger et al. | |
| 2011/0173172 A1 | 7/2011 | Hong et al. | |
| 2011/0178981 A1 | 7/2011 | Bowen et al. | |
| 2011/0188756 A1 | 8/2011 | Lee et al. | |
| 2011/0191321 A1 | 8/2011 | Gade et al. | |
| 2011/0258535 A1 | 10/2011 | Adler, III et al. | |
| 2011/0289105 A1 | 11/2011 | Hershowitz | |
| 2012/0016678 A1 | 1/2012 | Gruber et al. | |
| 2012/0019446 A1 | 1/2012 | Wu et al. | |
| 2012/0035932 A1 | 2/2012 | Jitkoff et al. | |
| 2012/0036468 A1 | 2/2012 | Colley | |
| 2012/0041752 A1 | 2/2012 | Wang et al. | |
| 2012/0078611 A1 | 3/2012 | Soltani et al. | |
| 2012/0143897 A1 | 6/2012 | Wei et al. | |
| 2012/0173222 A1 | 7/2012 | Wang et al. | |
| 2012/0222056 A1 | 8/2012 | Donoghue et al. | |
| 2012/0297294 A1 | 11/2012 | Scott et al. | |
| 2013/0016113 A1 | 1/2013 | Adhikari et al. | |
| 2013/0054617 A1* | 2/2013 | Colman | 707/748 |
| 2013/0091409 A1 | 4/2013 | Jeffery | |
| 2013/0132359 A1 | 5/2013 | Lee et al. | |
| 2013/0298030 A1* | 11/2013 | Nahumi et al. | 715/733 |
| 2013/0346872 A1 | 12/2013 | Scott et al. | |

OTHER PUBLICATIONS

U.S. Appl. No. 13/109,021, filed May 17, 2011, Matthew Robert Scott, "Network Search for Writing Assistance," 43 pages.

Ciccolini, "Baidu IME More literate in Chinese Input", Retrieved at <<http://www.itnews-blog.com/ il/81630.html>>, Sep. 15, 2011, 4 pages.

"Google launched Input Method editor—type anywhere in your language", retrieved at <<http://shoutingwords.com/google-launched-input-method-editor.html>>, Apr. 2, 2012, 12 pages.

"Google Transliteration Input Method (IME) Configuration", retrieved at <<http://www.technicstoday.com/2010/02/google-transliteration-input-method-ime-configuration/>>, Feb. 5, 2010, 1-13 pages.

Lenssen, "Google Releases Pinyin Converter", Retrieved at <<http://blogoscoped.com/archive/2007-04-04-n49.html>>, Apr. 4, 2007, 3 pages.

Lo, et al., "Cross platform CJK input Method Engine", retrieved at <<http://ieeexplore.ieee.org/stamp/stamp.jsp?tp=&arnumber=1175680>>, IEEE International Conference on Systems, Man and Cybernetics, Oct. 6, 2002, 1-6 pages.

Millward, "Baidu Japan Acquires Simeji Mobile App Team, for added Japanese Typing Fun", May 23, 2012, 3 pages.

Mohan, et al., "Input Method Configuration Overview", retrieved at <<http://gameware.autodesk.com/ documents/gfx_4 .0_ime.pdf>>, Jun. 3, 2011, 71 pages.

Scott, et al., "Engkoo: Mining theWeb for Language Learning", In Proceedings of the 49th Annual Meeting of the Association for Computational Linguistics: Human Language Technologies: Systems Demonstrations, Jun. 21, 2011, 6 pages.

"Search Engine", Microsoft Computer Dictionary, Mar. 2002 , Fifth Edition, pp. 589.

Sowmya, et al., "Transliteration Based Text Input Methods for Telugu", Proceedings of 22nd International Conference on Computer Processing of Oriental Languages. Language Technology for the Knowledge Based Economy, Mar. 2009, 122-132 pages.

Suematsu, et al., "Network Based Context Aware Input Method Editor," retrieved at <<http://ieeexplore.ieee.org/stamp/stamp.jsp?tp=&arnumber=5460679>>, Proceedings: Sixth International Conference on Networking and Services, Mar. 7, 2010, 1-6 pages.

"Windows XP Chinese Pinyin Setup", retrieved at <<http://www.pinyinjoe.com/pinyin/pinyin_setup.htm>>, Apr. 15, 2006, 1-10 pages.

Damper, "Self-Learning and Connectionist Approaches to Text-Phoneme Conversion", retrieved on May 26, 2010 at <<ftp://ftp.cogsci.ed.ac.uk/pub/joe/newbull.ps>>, UCL Press, Connectionist Models of Memory and Language, Jan. 1995, pp. 117-144.

"Database", Microsoft Computer Dictionary, Fifth Edition, retrieved on May 13, 2011, at <<http://academic.safaribooksonline.com/book/communications/0735614954>>, Microsoft Press, May 1, 2002, 2 pages.

(56) References Cited

OTHER PUBLICATIONS

"File", Microsoft Computer Dictionary, Fifth Edition, retrieved on May 13, 2011, at <<http://academic.safaribooksonline.com/book/communications/0735614954>>, Microsoft Press, May 1, 2002, 2 pages.
Office action for U.S. Appl. No. 12/693,316, mailed on Oct. 30, 2013, Huang, et al., "Phonetic Suggestion Engine", 24 pages.
Office action for U.S. Appl. No. 12/693,316, mailed on Jun. 19, 2013, Huang et al., "Phonetic Suggestion Engine", 20 pages.
Wikipedia, "Soundex", retrieved on Jan. 20, 2010 at http://en.wikipedia.org/wiki/soundex, 3 pgs.
"International Search Report & Written Opinion for PCT Patent Application No. PCT/US2013/053321", Mailed Date: Oct. 1, 2013, Filed Date: Aug. 2, 2013, 9 pages.
Final Office Action for U.S. Appl. No. 13/109,021, mailed on Jan. 11, 2013, Scott et al., "Network Search for Writing Assistance", 16 pages.
Office Action for U.S. Appl. No. 13/109,021, mailed on Aug. 21, 2012, Scott et al., "Network Search for Writing Assistance", 19 pages.
Office Action for U.S. Appl. No. 13/109,021, mailed on Sep. 25, 2013, Scott et al., "Network Search for Writing Assistance", 18 pages.
U.S. Appl. No. 13/331,023, filed Dec. 20, 2011, Tony Hou, Weipeng Liu, Weijiang Xu, and Xi Chen, "Scenario-Adaptive Input Method Editor ," 57 pages.
Komasu et al., "Corpus-based Predictive Text Input", Proceedings of the Third International Conference on Active Media Technology, May 2005, 6 pages.
Suzuki et al., "A Comparative Study on Language Model Adaptation Techniques using New Evaluation Metrics," Proceedings: HLT/EMNLP, Vancouver, Oct. 6-8, 2005, 8 pages.
Gamon, et al., "Using Statistical Techniques and Web Search to Correct ESL Errors", Jun. 2009, retrieved at http://research.microsoft.com/pubs/81312/Calico_published.pdf, CALICO Journal, vol. 26, No. 3, 2009, 21 pgs.
"Google Scribe", retrieved Mar. 27, 2012 at http://googlesystem.blogspot.com/2010/09/google-scribe.html, Nov. 2011, 2 pgs.
"Microsoft Research ESL Assistant", retrieved Mar. 27, 2012 at http://research.microsoft.com/en-us/projects/msreslassistant/, 3 pgs.
Wei, et al., "Wild Card Auto Completion", U.S. Appl. No. 12/960,258, filed Dec. 3, 2010.
Wikipedia, "Selection Based Search", retrieved Mar. 23, 2012 at http://en.wikipedia.org/wiki/Selection based search, 3 pgs.
Office action for U.S. Appl. No. 13/315,047, mailed on Feb. 12, 2014, Liu, et al., "Sentiment Aware User Interface Customization", 14 pages.
Office Action for U.S. Appl. No. 13/109,021, mailed on Mar. 11, 2014, Dyer, A.R., "Network Search for Writing Assistance," 18 pages.
Office action for U.S. Appl. No. 13/315,047, mailed on Apr. 24, 2014, Liu et al., "Sentiment Aware User Interface Customization", 13 pages.
Office action for U.S. Appl. No. 12/693,316, mailed on May 19, 2014, Huang et al., "Phonetic Suggestion Engine", 22 pages.
Office Action for U.S. Appl. No. 13/109,021, mailed on Jun. 19, 2014, Dyer, A.R., "Network Search for Writing Assistance," 42 pages.
Office action for U.S. Appl. No. 13/586,267, mailed on Jul. 31, 2014, Scott et al., "Input Method Editor Application Platform", 20 pages.
Non-Final Office Action for U.S. Appl. No. 13/331,023, mailed Aug. 4, 2014, Matthew Robert Scott et al., "Scenario-Adaptive Input Method Editor", 20 pages.
"Prose", Dictionary.com, received Jun. 19, 2014 at http://dictionary.reference.com/browse/Prose?s=t, 2 pgs.
Office action for U.S. Appl. No. 12/693,316, mailed on Oct. 16, 2014, Huang, et al., "Phonetic Suggestion Engine", 24 pages.
Office action for U.S. Appl. No. 13/586,267, mailed on Jan. 2, 2015, Scott et al., "Input Method Editor Application Platform", 19 pages.

* cited by examiner

BUSINESS INTELLIGENT IN-DOCUMENT SUGGESTIONS

BACKGROUND

In an enterprise, efficient document collaboration is a crucial activity for business productivity. Conventionally, the document collaboration within the enterprise can be divided into a number of distinct activities, such as authoring a document, searching for enterprise information associated with the document as well as organizing and analyzing the enterprise information. However, this document collaboration may present some problems (e.g., low efficiency) in the light of continuously growing data associated with the enterprise information.

SUMMARY

Described herein are techniques for unifying enterprise search and authoring by leveraging enterprise intelligence. A key word may be extracted from a content that a user is inputting into a document or selecting from the document. Based on the extracted key word, a query may be generated and submitted to an enterprise search service for an enterprise that the user is associated with. The enterprise search service may be for searching enterprise data, such as personnel data, product or service data, etc. Once the query results are received, a suggestion may be generated based on the query results. This suggestion may be then presented to a user device by integrating the suggestion into a user interface for displaying the document.

In some aspects of the disclosure, adding additional content or selecting a subset of the text may refine the suggestion.

In some aspects of the disclosure, the suggestion may be one of a people suggestion, a document suggest, a phrase suggestion or a document template suggestion. In some embodiments, a suggested document may be added to a citation section of the authored document when text is pasted from the suggested document to the authored document. In some embodiments, the citation for the authored document may embed a light-weight viewer for the suggested document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to implement real-time business intelligent in-document suggestions. As used herein, the term "in-document suggestions" means that the suggestions are presented in a user interface for displaying the document, not that those suggestions are automatically placed within the document. Enterprise intelligence may be leveraged more effectively by exploiting context of an authored document and unifying enterprise search and authoring. This unification may provide a user experience that reduces clicks and context switching, thus increasing the business productivity.

While authoring a document, a key word may be extracted from content that a user is inputting into the document or selecting from the document. Based on the extracted key word, a query may be generated and submitted for enterprise search associated with an enterprise that the user is associated with. Once query results are received, a suggestion may be generated based on the query results. This suggestion may be then presented to a user by integrating the suggestion into a user interface for displaying the document.

Illustrative of Environment

Figure 1:
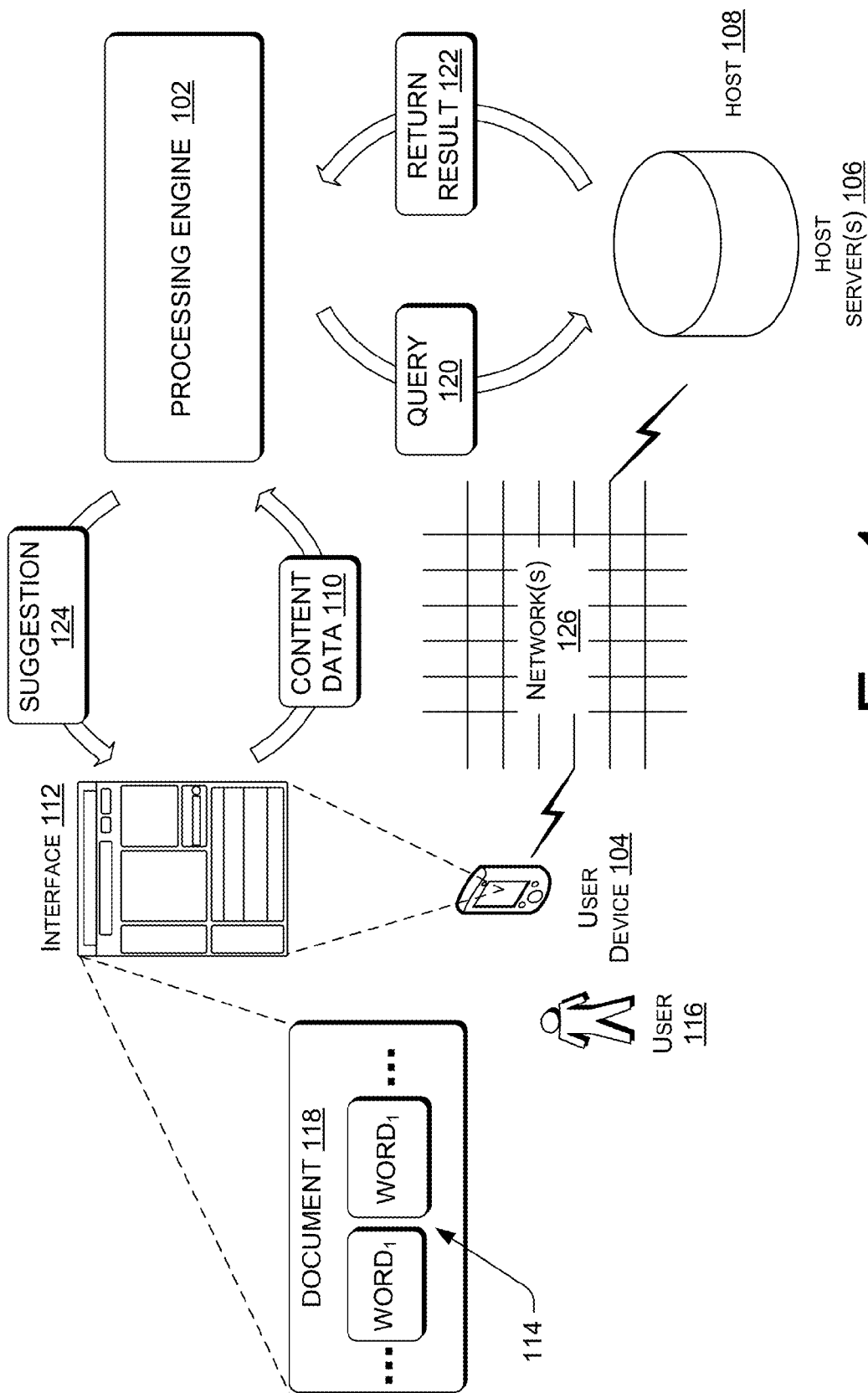
FIG. 1 is a schematic diagram of an illustrative computing environment that supports business intelligent suggestions.

FIG. 1 is a schematic diagram of an illustrative computing environment 100 that supports a processing engine 102 that performs real-time business intelligent suggestions. The processing engine 102 may be implemented by a user device 104 or a host server 106 of a host 108. The processing engine 102 may acquire content data 110. The content data 110 may be acquired from an interface 112 that is operating on the user device 104, and/or acquired from other sources. The content data 110 may include user inputs of content into the interface 112. For example, in a scenario in which the application is a word processor (e.g., Microsoft Office Word®), the user inputs may include a current text (e.g., words 114) that a user 116 is typing and/or previous text that the user is selecting while authoring a document 118.

The content data 110 may further include application specific data and environment data. The application specific data may include the name and the type of the application, and/or a current state of the application (e.g., idle, receiving, input, processing data, and outputting data). The environment data may include data on the real-world environment. For example, the environmental data may include a time at each instance when the user inputs content, the weather at each time when the user inputs text, etc. The environmental data may also concurrently or alternatively include current system software and/or hardware status or events of the user device 104. Additionally, the content data 110 may include user status data collected from personal web services by the user. The collected status data may provide explicit or implicit clues regarding the document 118 that the user 116 is authoring.

After the processing engine 102 has acquired the content data 110, the processing engine 102 may recognize and extract a key word from the content data 110. In some embodiments, the processing engine 102 may use machinelearning-based techniques, such as natural language processing (NLP), computational linguistics, and/or text analytics to recognize and to extract the key word. In these instances, a learning model may be generated from a corpus of training data that includes a large number of sentences associated with enterprise intelligence. In some embodiments, the training data may include enterprise intelligence associated with an enterprise that the user 116 is working with.

Based on the key words extracted from the content data 110, the processing engine 102 may formulate a query 120 and submit the query 120 to a web service hosted by the host server. For example, the web service may include an enterprise search. In these instances, the host server 106 may conduct the enterprise search, generate a result 122, and transmit the result 122 to the processing engine 102. In some embodiments, the enterprise search may be hosted by other web service providers. In these instances, the host server 106 may enable the processing engine 102 to receive the result 122 from servers of the web service providers.

Once receiving the result 122, the processing engine 102 may generate a suggestion 124 based on the result 122. The suggestion 124 may be a suggested document, one or more suggested people, a suggested phrase, a suggested documental template, a suggested enterprise statistics and/or any other suggested information that is associated with the enterprise. The processing engine 102 may then transmit the suggestion 124 to the interface 112.

The suggestion 124 may then be displayed by the interface 112 on the user device 104. The user device 104 may, via the interface, enable the user 116 to compose, edit, format, print and conduct any other productions of a portion (e.g., words 114) or entire of the document 118. The user device 104 may be a mobile telephone, a smart phone, a tablet computer, a laptop computer, a network, a personal digital assistance (PDA), a gaming device, a media player, or any other mobile computing device that includes a display, and can interface with a user via a user interface and connect to one or more networks 126 to exchange information with the host server 106 or another server providing an enterprise search.

The network(s) 126 may include wired and/or wireless networks that enable communications between the various computing devices described in the computing environment 100. In some embodiments, the network(s) 126 may include local area networks (LANs), wide area networks (WAN), mobile telephone networks (MTNs), and other types of networks, possibly used in conjunction with one another, to facilitate communication between the various computing devices (i.e., the user device 104 and/or the host server 106). The computing devices are described in greater detail with reference to the following figures.

As discussed herein, a document refers to any multi-line text input area for any application, whether a text area field within a webpage, an editing window for a chat client (e.g., instant messaging client, etc.), and/or any editing surfaces within office suite authoring programs (e.g., electronic mail (email) clients, word processors, note-taking software and presentation software). Additionally, the user 116 may author the document 118 within mobile text input areas such as to author an SMS (Short Message Service) text message via the user device 104.

Illustrative of Architecture

Figure 2:
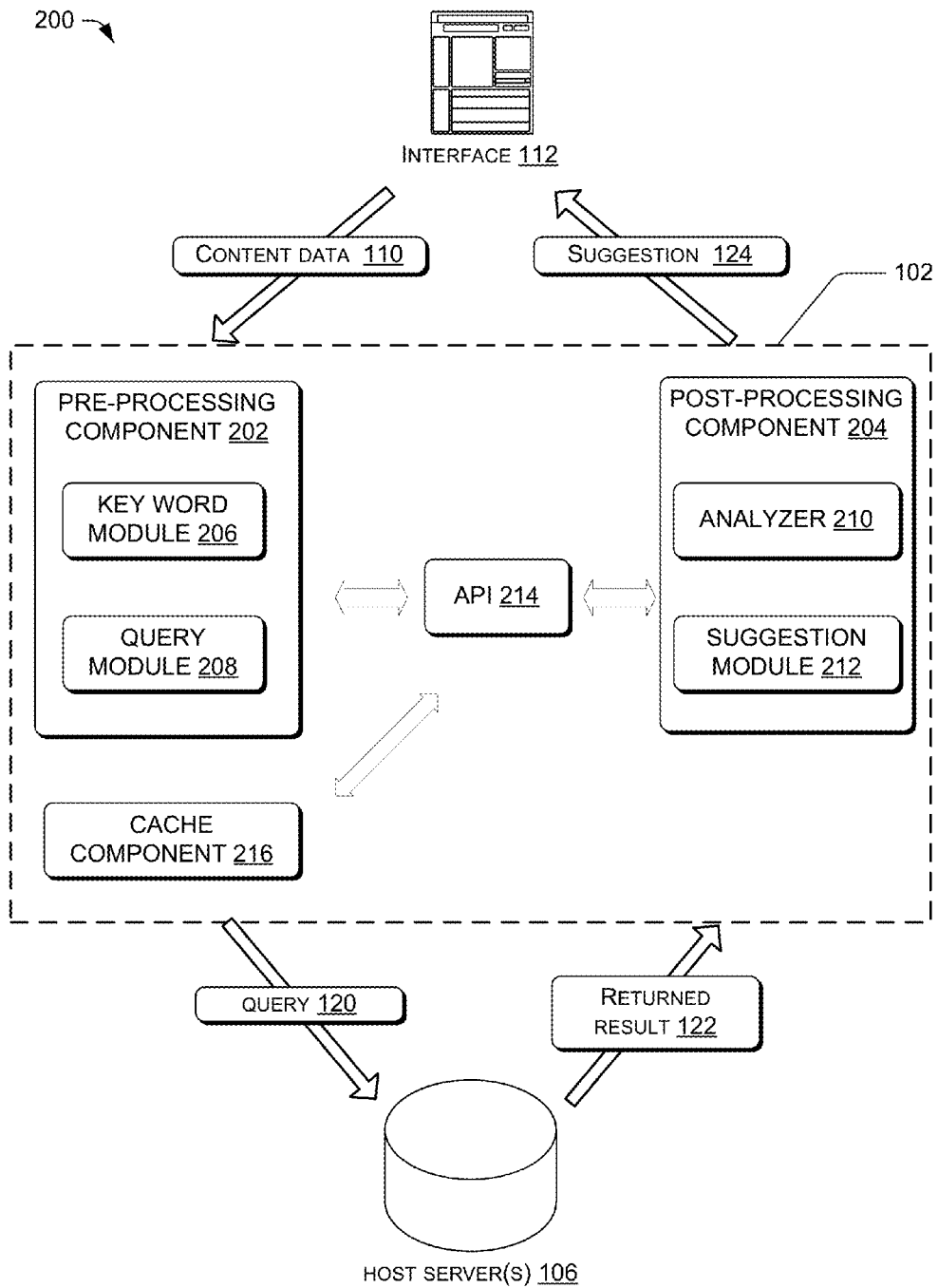
FIG. 2 is a schematic diagram of an illustrative scheme that implements business intelligent suggestions.

FIG. 2 is a schematic diagram of an illustrative scheme 200 that implements business intelligent suggestions. The scheme 200 may include the interface 112, the host server 106 and the processing engine 102. At least a part of the processing engine 102 may be implemented as a cloud-type application that queries, analyzes, manipulates returned results from web services, and presents suggestions on a computing device. In some embodiments, at least a part of the processing engine 102 may be implemented by a web application that runs on the user device 104.

The processing engine 102 may include a pre-processing component 202 and a post-processing component 204. The pre-processing component 202 may acquire the content data 110 from the interface 112. The pre-processing component 202 may include a key word module 206 and a query module 208. Once acquiring the content data 110 from the interface 112, the key word module 206 may analyze the content data 110 to extract a key word from the content data 110. The extraction may be implemented by machine-learning-based technologies, such as NLP, using a training data associated with enterprise intelligence of an enterprise. In some embodiments, the training data may be associated with the enterprise intelligence of the enterprise that the user is working with. Based on the extracted key word, the query module 208 may formulate the query 120.

In some embodiments, the extraction and query generation may be implemented by hooking into an object model (OM) associated with a word processor (e.g., Microsoft Office Word®). The OM may provide crucial information regarding the content data 110 acquired from the document 118, which lets the key word module 206 make decisions on what key word(s) to identify and enable query generation. For example, the pre-processing component 202 may be implemented as a web application that runs on the user device 104. The client side object model may be used as a part of a web Extension Framework to integrate the pre-processing component 202 with the document 118. The web application may runs in Silverlight® with an elevated trust. The user 116 may click a tool bar (e.g., the Ribbon®) or select text manually to trigger acquiring content data 110 from the web application, extracting the key word, and formulating the query 120.

Once the query 120 is formulated, the query module 208 may submit the query 120 to a web service hosted by the host server 106. For example, the web service may be an enterprise search. The host server 106 may host a web application platform (e.g., Microsoft SharePoint) for common enterprise web requirements. In some embodiments, the web application platform may enable an enterprise to manage, scale and/or initiate a board variety of business applications. In some embodiments, the web application platform may include pre-defined "applications" for commonly requested functionalities, e.g., intranet portals, extranets, websites, document & file management, collaboration space, social tools, enterprise search and enterprise intelligence. For example, the enterprise search may be implemented by the web application platform to search the enterprise resources. The enterprise search may index data and documents from a variety of sources such as file systems, intranets, document management systems, electronic mails, and database within the enterprise. Security policies may be used to control the access to the enterprise search.

In some embodiments, the web application platform may be hosted by another web service provider. In these instances, the host server 106 may host a web application that implements functionalities of the processing engine 102.

After the host server 106 processes the query 120, the host server 106 may return the result 122 to the post-processing component 204. The post-processing component 204 may include an analyzer 210 and a suggestion module 212. The analyzer 210 may analyze the result 122. In some embodiments, the analyzer 210 may analyze the result 122 to remove data that does not align with the key words extract from the interface 112. The analyzer 210 may remove the data from the result 122 based on a predetermined rule specified by the enterprise and/or the user 116. In some embodiments, the analyzer 210 may receive multiple results. The analyzer 210 may sort the multiple returned results based on, for example, types. After analyzing and manipulating the result 122, the analyzer 210 may feed the result 122 to the suggestion module 212 to generate the suggestion 124.

In some embodiments, the suggestion module 212 may generate suggestion 124. The suggestion 124 may be a people suggestion, which may indicate certain people aligned with the content data 110. The people may be, for example, an expert of a certain technical area related to the content data 110 and/or the extracted key word. The people suggestion may further indicate information of the people, such as their expertise, office locations, current availabilities, pictures, contact information, documents authored by the people, enterprise groups that the people belong to, and/or any other enterprise information associated with the people.

In some embodiments, the suggestion 124 may be a document suggestion, which may indicate a document aligned with the content data 110. The document suggestion may further indicate an enterprise policy, a document template, a legal statement, confidential information, an enterprise statistics, metadata associated with the suggested document and the document 118. For example, the document template may be aligned with the content data 110 or a format of the document 118. In some embodiments, the suggestion 124 may be a phrase suggestion that assists the user 116 to input additional content. In some embodiments, the suggestion module 212 may generate multiple suggestions, which may include a people suggestion, a document suggestion, a phrase suggestion and/or other suggestions aligned with the content data 110.

After the suggestion 124 is generated, the suggestion module 212 may transmit the suggestion 124 to the interface 112. The interface 112 may then display the suggestion 124 on the user device 104, the displaying being discussed in a greater detail in FIGS. 5-7.

In some embodiments, the processing engine 102 may include an applications programming interface (API) 214 that may be available for access by a web application that runs on the user device 104 or for access by web services hosted on the host server 106. For example, the API 214 may be object-oriented component-based API, such as the Windows Communication Foundation (WCF) included on the .NET™ Framework manufactured by the Microsoft Corporation, Redmond, Wash.

In some embodiments, the processing engine 102 may include a cache component 216. The cache component 216 may store list query results and/or objects such as suggested documents, sites and webs that are associated with the enterprise. These objects may be expensive to create. Therefore, the cache component 216 may improve the performance of the processing engine 102 if the same objects are repeatedly accessed. In some embodiments, the cache component 216 may be implemented by using a back-end caching. In these instances, the cache component 216 may reside within a site architecture (e.g., the host server 106) that provides the enterprise search, and cache the list query results and/or suggested information including, for example, people, documents, templates and statistics that are aligned with the content data 110. In some embodiments, the cache component 216 may be implemented by using a proxy caching. In these instances, the cache component 216 may reside outside of the site architecture that provides the enterprise search.

Illustrative Operation

Figure 3:
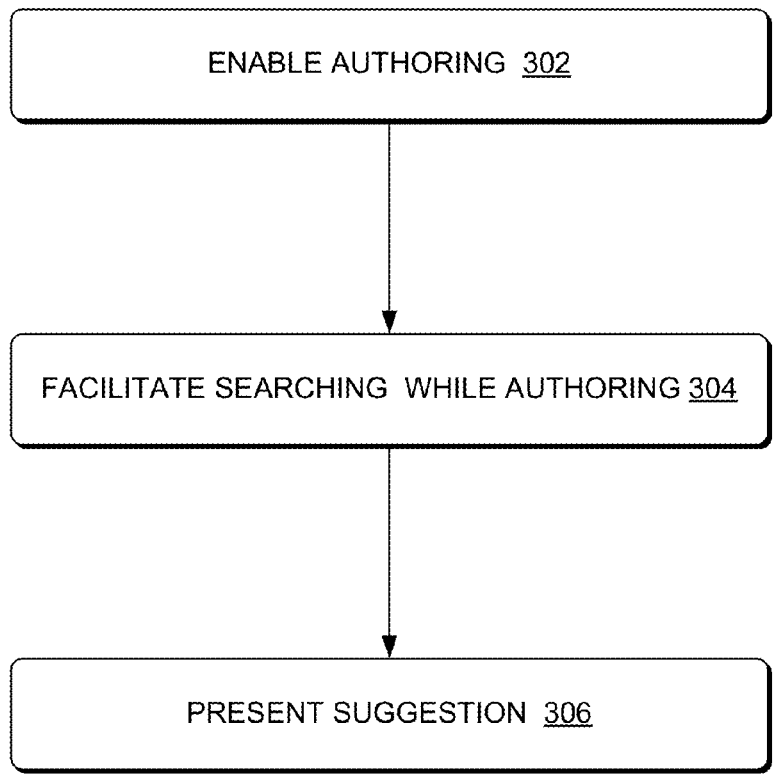
FIG. 3 is a flow diagram of an illustrative process to enable real-time enterprise search while authoring.

FIG. 3 is a flow diagram of an illustrative process 300 to enable real-time enterprise search while authoring. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, including the process 400, in addition to the process 300, shall be interpreted accordingly.

At 302, the interface 112 may enable the user 116 to author the document 118. In some embodiments, the user 116 may conduct an online chat or email composition. Via the interface 112, the user 116 may compose, edit, format, print and conduct any other productions of a portion (e.g., the words 114) or entire of the document 118 (e.g., a chat log or an email).

At 304, the processing engine 102 may facilitate an enterprise search while the user 116 is authoring. The processing engine 102 may acquire the content data 110 from the interface 112 and generate the query 120 based on the content data 110. The query 120 may be transmitted to the host server 106, which may then conduct the enterprise search and return the result 122 to the processing engine 102. In some embodiments, the result 122 may be stored in the cache component 216. In these instances, the result 122 may be directly returned to the post-processing component 204. Accordingly, the ambient search in this disclosure may integrate searching, analyzing and writing tightly.

At 306, the interface 112 may present the suggestion 124 on the user device 104. The suggestion 124 may be a people suggestion, a document suggestion, a template suggestion, enterprise statistics and/or other suggested information aligned with the content data 110. The suggestion 124 may be surfaced inside of the user interface 112 displaying the document 118 such that the suggestion 124 is integrated into the user interface 112. In some embodiments, the suggestion 124 may be surfaced by implementing an Input Method Editor (IME). In some embodiments, the suggestion 124 may be attached to the document 118, which, for example, may be an electronic mail (email).

Figure 4:
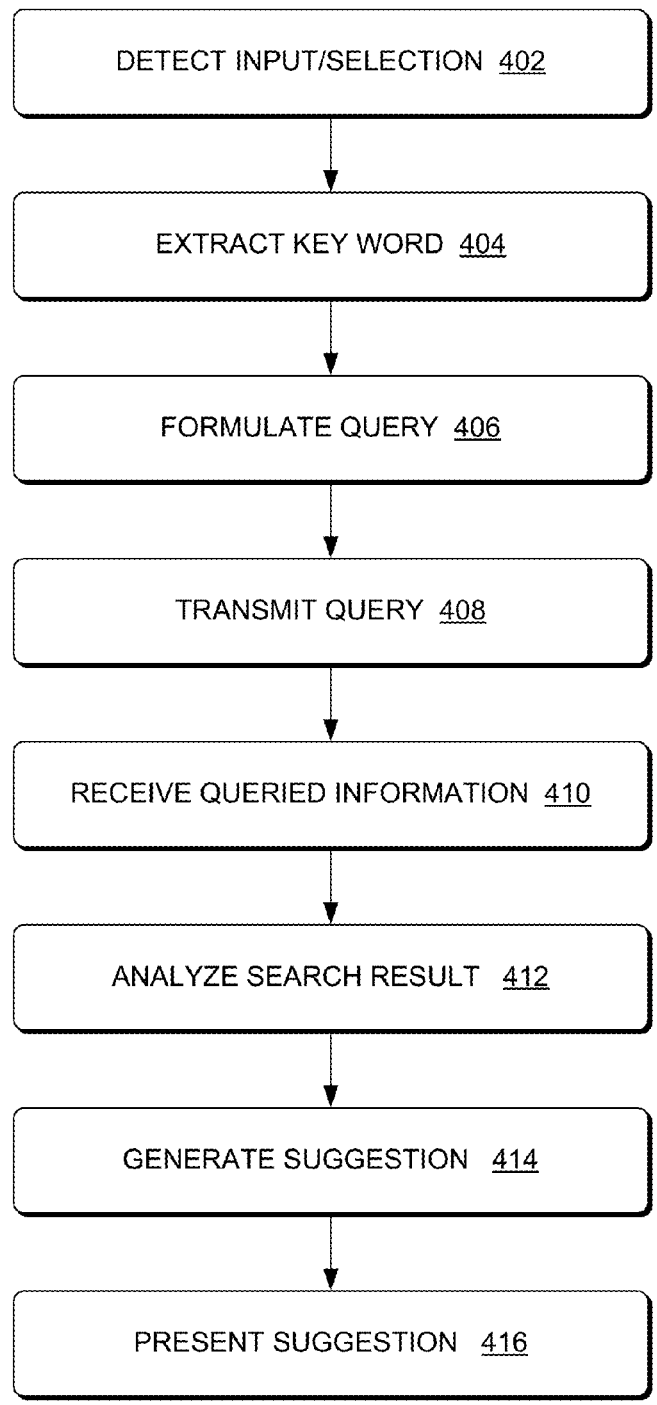
FIG. 4 is a flow diagram of an illustrative process for real-time enterprise search by generating a query while authoring and presenting business intelligent suggestions.

FIG. 4 is a flow diagram of an illustrative process 400 for real-time enterprise search by generating a query while authoring and presenting business intelligent suggestions. At 402, the processing engine 102 may detect the content data 110 that the user 116 is inputting or selecting. This detection may trigger ambient search conducted by the processing engine 102. In these instances, the processing engine 102 may extract key words from the content data 110 in response to the detection. For example, the processing engine 102 may conduct the ambient search in response to detecting that user 116 manually selects text of the document 118. In some embodiments, the user 116 may trigger the ambient search by clicking a tool bar of an application (e.g., a ribbon of Microsoft Office Word®).

At 404, the processing engine 102 may extract a key word from the content data 110. The extraction may be implemented by a machine-learning-based technology, such as NLP. In some embodiments, the machine-learning-based technology may be trained by using a business model including data associated with the enterprise intelligence of an enterprise. In some embodiments, the extraction of the content data 110 may be implemented by using an object model (OM) such that the document 118 can be explored in a syntactic way. The OM may be associated with the application running the interface 112, and provide crucial information regarding the document 118. This crucial information may enable the processing engine 102 to identify the key word for query generation.

At 406, the processing engine 102 may formulate the query 120 based on the key word extracted from the content data 110. In some embodiments, the query 120 may be structured such that an enterprise search engine may be used to search the enterprise wide resources and/or other search engines may be used to search other data sources. At 408, the query 120 may then submitted to an enterprise search hosted by the host server 106. At 410, the result 122 may be received by the processing engine 102. In another embodiment, the query 120 is submitted to a search engine of an enterprise designated for searching data of the enterprise.

After receiving the result 122, the processing engine 102 may analyze the result 122 at 412. For example, the processing engine 102 may parse the result 122 and sort them based on various types. These types may be documents, people, templates, phrases, and other search results aligned with the content data 110. Based on the analyzed and sorted result 111, the processing engine 102 may generate the suggestion 124 at 414.

The suggestion 124 may be a document suggestion, a people suggestion, a phrase suggestion and/or other suggestions aligned with the content data 110. For example, the document suggestion may indicate specific policies, legal statement (e.g., contracts), document templates that are aligned with the content data 110. The people suggestion may indicate people who authored the suggested documents, experts in certain technical area that is related to the technical area reflected in the content data 110, and other people that are aligned with the content data 110. The phrase suggestions may include phrases assisting the user 116 to input additional content in the document 118. In some embodiments, adding additional words or selecting a subset of text (e.g., the content data 110) may trigger another ambient search and/or refining the suggestion 124.

Figure 5:
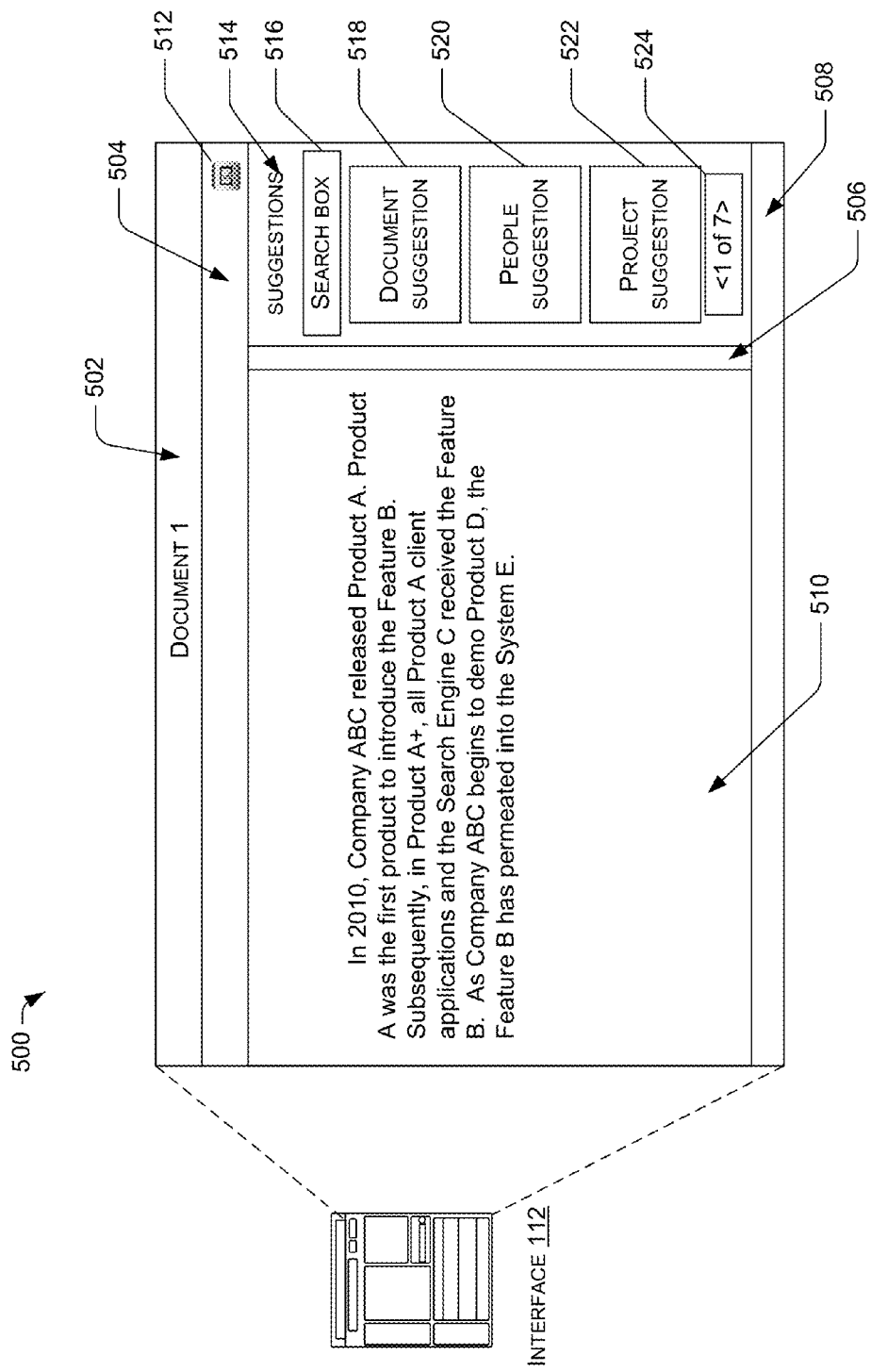
FIG. 5 is an illustrative user interface (UI) of an application that surfaces business intelligent suggestions.
Figure 6:
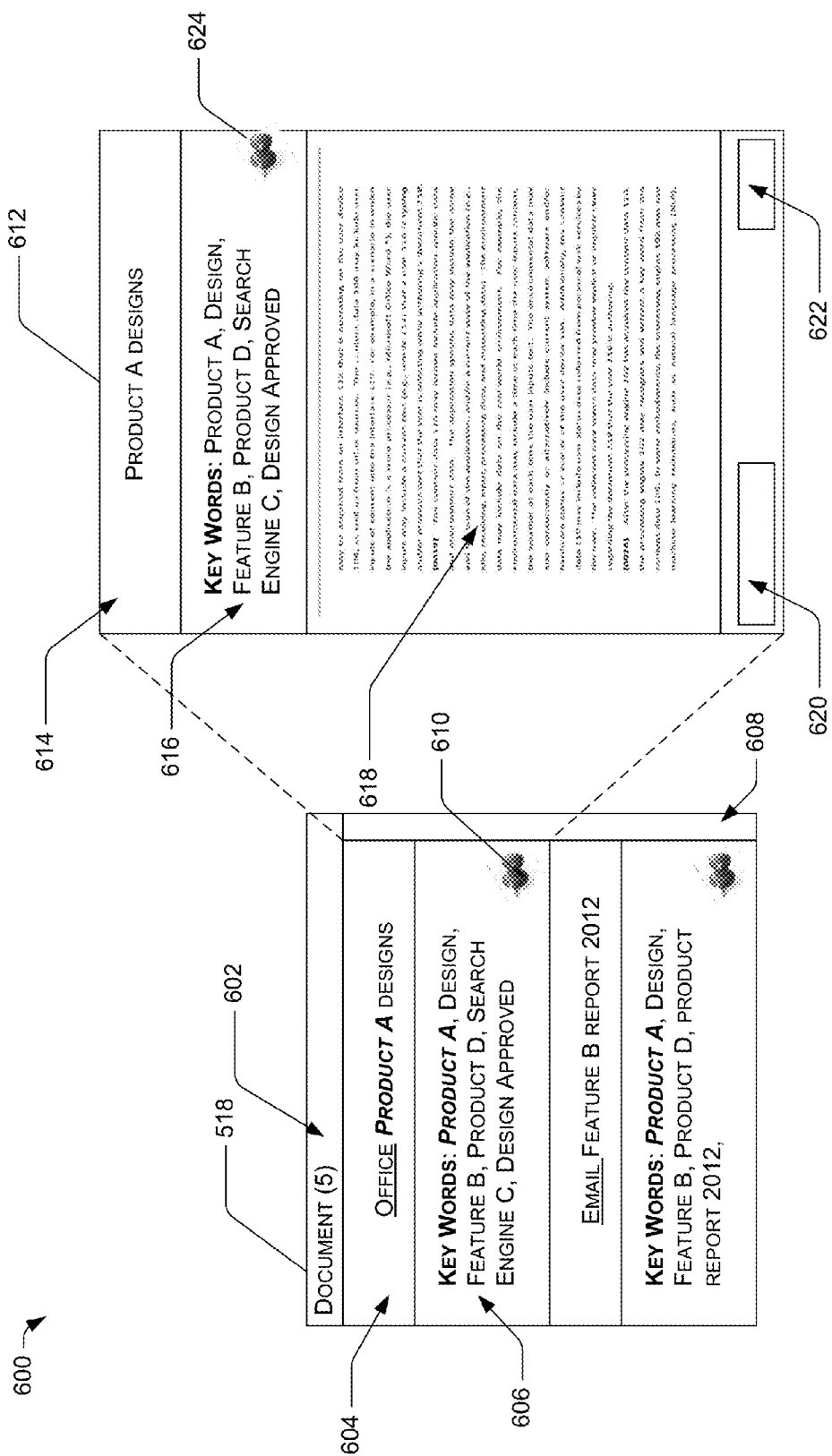
FIG. 6 is an illustrative user interface (UI) that illustrates a document suggestion section as shown in the UI 500 of FIG. 5.
Figure 7:
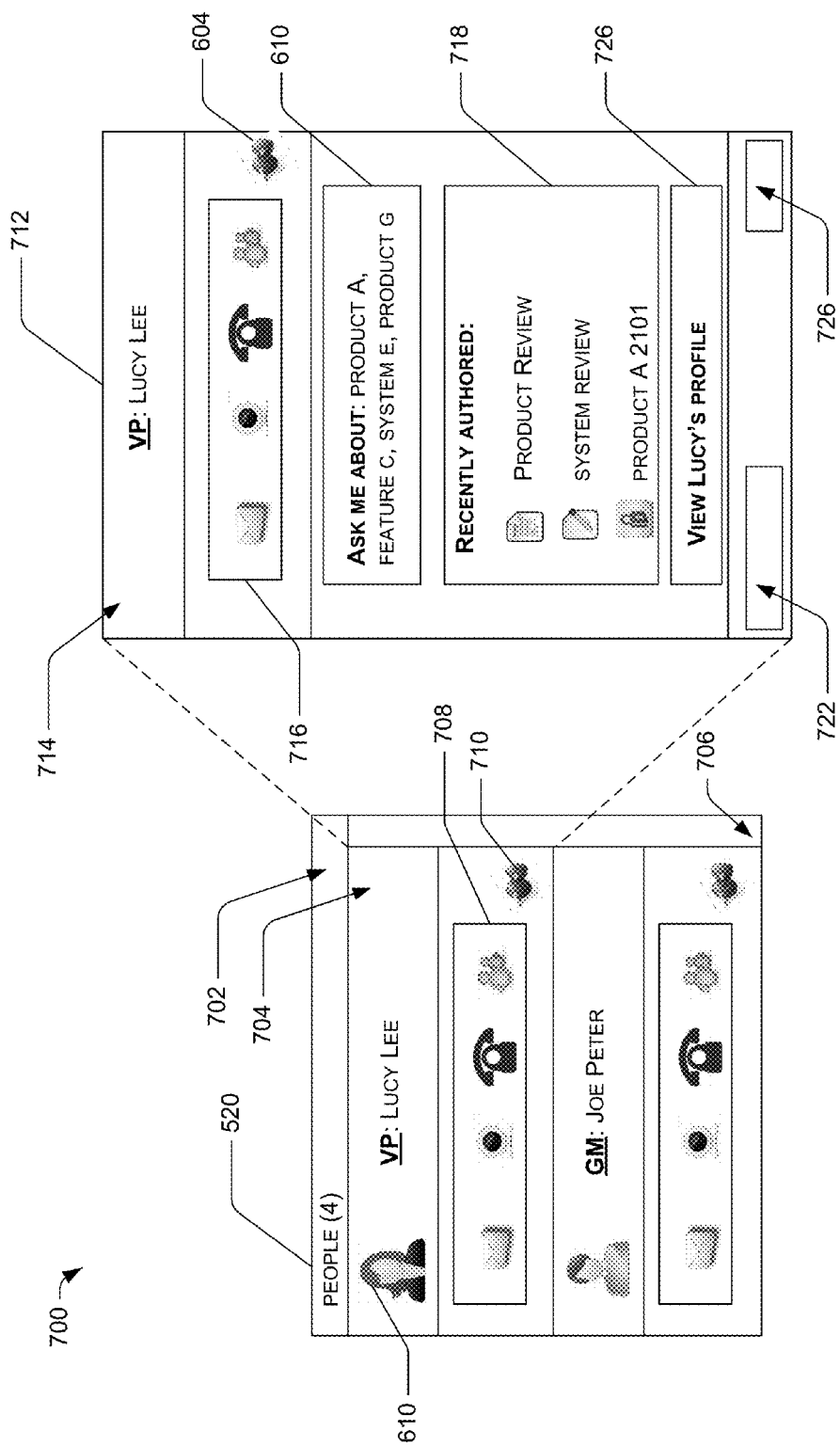
FIG. 7 is an illustrative user interface (UI) that illustrates a people suggestion section as shown in the UI 500 of FIG. 5.

At 416, the suggestion 124 may be presented to the interface 112 on the user device 104, is the displaying being discussed in a greater detail in FIGS. 5-7. In some embodiments, the interface 112 may automatically add a suggested document to a citation section of the document 118 when text is pasted from the suggestion document to the document 118. In these instances, the citation section of the document 118 may embed a light-weight view in the suggested document.

Illustrative Interfaces

FIGS. 5-7 are illustrative user interfaces (UI) that enable enterprise search while authoring. While FIGS. 5-7 illustrate three example user interfaces, it is to be appreciated that multiple other graphical or non-graphical user interfaces may be employed to enable enterprise search while authoring.

FIG. 5 is an illustrative user interface (UI) 500 of an application that surfaces business intelligent in-document suggestions by implementing the process 400 with reference to FIG. 4. The UI 500 may be presented by a web application (e.g., Microsoft Live Office® web applications) hosted on the host server 106, and displayed by the user device 104. In some embodiments, the UI 500 may be presented by an application (e.g., Microsoft Office Word®) that runs on the user device 104. In these instances, a web extension for the application is built upon a web extension framework, which may enable web applications to authenticate with active users and allow integration with the application.

The UI 500 may include a title section 502, a toolbar section 504, a scrollbar section 506, a status section 508 and a content section 510. The title section 502 may include a title of the document 118 (e.g., Document 1). The toolbar section 504 may be filled with graphical representations of control elements, which are grouped by different functionalities. For example, the toolbar section 504 may include a ribbon 512 that is used to trigger the ambient search conducted by the processing engine 102. The scrollbar section 506 may control the presentation of continuous text, picture or other content that can be scrolled. The status section 508 may display messages, such as a cursor position, a number of pages in the document 118, and a state of the caps lock, num lock, and scroll lock keys. The content section 510 may allow the user 116 to input or select the content data 110.

The UI 500 may also include a suggestion section 514 that enable the user 116 to review and to manipulate suggestions generated by the processing engine 102. The suggestion section 514 may include a search box 516 that may indicate a key word extracted from the content data 110. In some embodiments, the search box 516 may enable the user 116 to input a key word as a query for the enterprise search. The suggestion section 514 may also include a document suggestion 518, a people suggestion 520, a project suggestion 522, and an indicator 524. The project suggestion 522 may provide information for projects that are running in the enterprise and aligned with the content data 110. The indicator 524 may indicate a current page number and/or a number of pages in suggested information. The document suggestion 518 and the people suggestion 520 are discussed in a greater detail in FIGS. 6 and 7.

FIG. 6 is an illustrative user interface (UI) 600 that further illustrates the document suggestion 518 as shown in the UI 500 of FIG. 5. The document suggestion 518 may include a summary box 602 indicating a number of the suggested documents, a title box 604 indicating a title and a type of the suggested document (e.g., Product A designs), a key word box 606 indicating key words associated with the suggested document, and a sub-scrollbar 608 that enable the user 116 to read other suggested documents.

The document suggestion 518 may also include an expander 610 that enables the user 116 to further review one of the suggested documents (e.g., Product A designs) by expanding the document suggestion 518 to an expanded suggestion document 612. The expanded suggestion document 612 may display the suggested document in a greater detail (e.g., Product A designs). The expanded suggestion document 612 may include a expanded title box 614, a expanded key word box 616, a content preview box 618, a status box 620, and a full screen view box 622 that enable the user 116 to view "Product A designs" in a full screen. The content preview box 618 may provide a preview of the suggested document for the user 116 to review. The expanded suggestion document 612 may also include a restorer 624 that enable the user 116 to restore the expended suggestion document 612 to the document suggestion 518.

FIG. 7 is an illustrative user interface (UI) 700 that further illustrates a people suggestion 520 as shown in the UI 500 of FIG. 5. The people suggestion 520 may include a summary box 702 indicating a number of the suggested people, a title box 704 indicating a name, a title and a picture of the suggested people (e.g., Lucy Lee), a sub-scrollbar 706 that enable the user 116 to read other suggested people, and a contact box 708 indicating various communication tools that enable the user 116 to contact the suggested people. The various communication tools may include an email, a video conference, a teleconference and an instant messaging.

The people suggestion 520 may also include an expander 710 that enables the user 116 to further review one of the suggested people (e.g., Lucy Lee) and to expand the people suggestion 520 to an expanded people suggestion 712. The expanded people suggestion 712 may display the suggested document in a greater detail. The expanded people suggestion 712 may include a expanded title box 714, a expanded contact box 716, an expertise box 718, a recently authored document box 720, a status box 722, a profile box 724 and a full screen view box 726 that enable the user 116 to view "Product A designs" in a full screen. The expanded people suggestion 712 may also include a restorer 728 that enable the user 116 to restore the expended people suggestion 712 to the people suggestion 520.

Illustrative Computing Device

Figure 8:
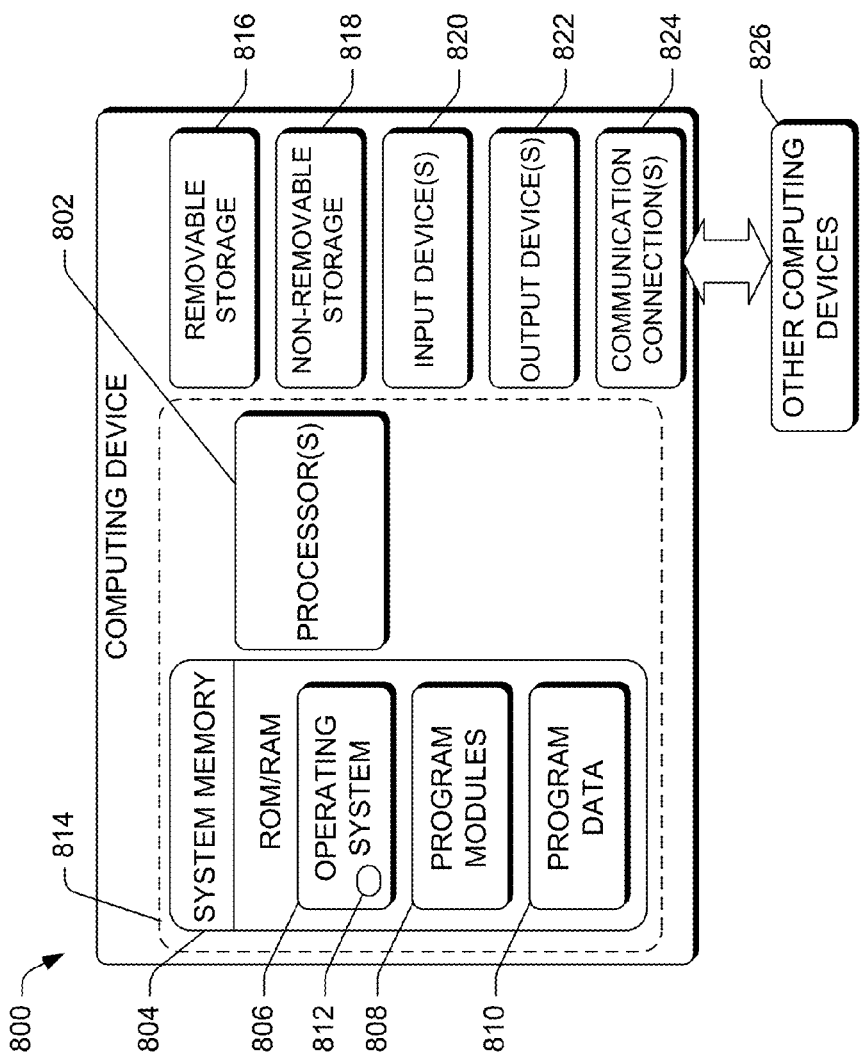
FIG. 8 is a block diagram of an illustrative computing device that may be deployed in the environment and the architecture shown respectively in FIGS. 1 and 2.

FIG. 8 shows an illustrative computing device 800 that may be used to implement the platform for continuous mobile-cloud services. It will readily be appreciated that the various embodiments described above may be implemented in other computing devices, systems, and environments. The computing device 800 shown in FIG. 8 is only one example of a computing device and is not intended to suggest any limitation as to the scope of use or functionality of the computer and network architectures. The computing device 800 is not intended to be interpreted as having any dependency or requirement relating to any one or combination of components illustrated in the example computing device.

In a very basic configuration, the computing device 800 typically includes at least one processing unit 802 and system memory 804. Depending on the exact configuration and type of computing device, the system memory 804 may be volatile (such as RAM), non-volatile (such as ROM, flash memory, etc.) or some combination of the two. The system memory 804 typically includes an operating system 806, one or more program modules 808, and may include program data 810. The operating system 806 includes a component-based framework 812 that supports components (including properties and events), objects, inheritance, polymorphism, reflection, and provides an object-oriented component-based application programming interface (API). The computing device 800 is of a very basic configuration demarcated by a dashed line 814. Again, a terminal may have fewer components but will interact with a computing device that may have such a basic configuration.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 816 and non-removable storage 818. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 804, the removable storage 816 and the non-removable storage 818 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 800. Any such computer storage media may be part of the computing device 800. Moreover, the computer-readable media may include computer-executable instructions that, when executed by the processor(s) 802, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 800 may also have input device(s) 820 such as keyboard, mouse, pen, voice input device, touch input device, etc. Output device(s) 822 such as a display, speakers, printer, etc. may also be included. These devices are well known in the art and are not discussed at length here.

The computing device 800 may also contain communication connections 824 that allow the device to communicate with other computing devices 826, such as over a network. These networks may include wired networks as well as wireless networks. The communication connections 824 are one example of communication media.

It is appreciated that the illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 800 may be implemented in a cloud computing environment, such that resources and/or services are made available via a computer network for selective use by the user devices 104.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A computer-implemented method, the method comprising:
   at a processing engine,
   detecting addition of content to a document or selection of content from the document;
   generating a query based on the added or selected content;
   submitting the query to a search service for an enterprise, the search service for searching data of the enterprise;
   receiving a result from the search service in response to the query; and
   presenting the result by integrating the result into a user interface for presenting the document,
   wherein the presented result comprise multiple suggestions including at least one of:
   a people suggestion indicating a user associated with the enterprise and aligned with the content, a document suggestion indicating a document associated with the enterprise and aligned with the content, or a statistics suggestion indicating a statistic associated with the enterprise.

2. The computer-implemented method of claim 1, wherein the query is further generated based on a business model, and the business model is generated using training data associated with business intelligence of the enterprise.

3. The computer-implemented method of claim 1, further comprising extracting a key word based on the content using a business model, wherein the extracting the key word is implemented using an Object Model (OM) of a word processor that is used for producing the document.

4. The computer-implemented method of claim 1, wherein the enterprise further provides web service functionalities including at least one of:
   intranet portals,
   websites,
   web content management,
   social tools, and
   document and file management.

5. The computer-implemented method of claim 1, the multiple suggestions further include at least one of:
   a phrase suggestion that assists content authoring, or
   a document template suggestion indicating a document template that is used by the enterprise and aligned with at least one of the content or a format of the document.

6. The computer-implemented method of claim 1, further comprising:
   at the processing engine, detecting that the user is selecting a subset of the content; and
   refining the result in response to the selecting the subset of the content.

7. One or more physically tangible computer-readable media storing computer-executable instructions that, when executed on one or more processors, causes the one or more processors to perform acts comprising:
   extracting a key word from content being input in a document;
   generating, based on the extracted key word, a query to a search service associated with business intelligence for an enterprise, the search service for searching data of the enterprise;
   receiving a result from the search service in response to the query; and
   presenting a suggestion in a user interface for displaying the document, the suggestion being associated with the result,
   wherein the suggestion comprises a people suggestion based on the result, the people suggestion indicating one or more people of the enterprise and enterprise information associated with the one or more people.

8. The one or more physically tangible computer-readable media of claim 7, wherein the extracting the key word comprises:
   detecting that the user is inputting the content into the document or selecting text of the document; and
   extracting the key words from the content or the text.

9. The one or more physically tangible computer-readable media of claim 7, wherein the receiving the result comprises receiving multiple results, and wherein the acts further comprise:
   analyzing the multiple results;
   grouping the multiple results based on types; and
   generating the suggestion based on the analyzed and grouped multiple results.

10. The one or more physically tangible computer-readable media of claim 7, wherein the people suggestion indicates one or more people of the enterprise and enterprise information associated with the one or more people, the enterprise information including at least one of:
    an expertise of the one or more people,
    an office location of the one or more people,
    a current availability of the one or more people,
    a picture of the one or more people,
    contact information of the one or more people,
    a document authored by the one or more people, the document being authored in a predetermined time of period and aligned with the content, or
    a group that the one or more people belong to.

11. The one or more physically tangible computer-readable media of claim 7, wherein the people suggestion indicating one or more people that are associated with the enterprise and are experts in a technical area aligned with the content.

12. The one or more physically tangible computer-readable media of claim 7, wherein the acts further comprise generating a document suggestion based on result, the document suggestion indicating one document of the enterprise, the one document including at least one of:
    an enterprise policy aligned with the content,
    a document template aligned with the content or with a format of the document that the user is inputting the content into,
    a legal statement aligned with the content,
    confidential information associated with the enterprise and aligned with the content,
    an enterprise statistic aligned with the content, or
    metadata associated with the document and the one document.

13. The one or more physically tangible computer-readable media of claim 7, wherein the acts further comprise generating a phrase suggestion based on the result, the phrase suggestion indicating a phrase assisting content authoring.

14. The one or more physically tangible computer-readable media of claim 7, wherein the suggestion indicates a suggested document and provides a preview of the suggested document.

15. The one or more physically tangible computer-readable media of claim 7, wherein the suggestion indicates a suggested document, and wherein the acts further comprise adding the suggested document to a citation section of the document when detecting that text of the suggested document is pasted into the document, a citation of the document embedding a light-weight viewer of the suggested document.

16. A system comprising:
    one or more processors; and
    memory to store a plurality of components executable on the one or more processors, the plurality of components comprising:
    a key word module that extracts a key word from a document being authored,
    a query module that:
       generates a query based on the key word,
       submits the query to a search engine of an enterprise designated for searching data of the enterprise, and
       receives a result from the search engine in response to submitting the query,
    a suggestion module that generates a suggestion based on the result, and
    an interface that surfaces the suggestion in a user interface for displaying the document, wherein the generated suggestion comprises at least one of:
- a people suggestion indicating a user associated with the enterprise and aligned with the key word,
- a document suggestion indicating a document associated with the enterprise and aligned with the key word, or
- a statistics suggestion indicating a statistic associated with the enterprise and aligned with the key word.

17. The system of claim 16, wherein the surfacing the suggestion in the user interface for displaying the document comprise surfacing the suggestion in the user interface such that the suggestion is displayed in a panel alongside the document.

18. The system of claim 16, wherein the suggestion indicates a suggested document and wherein the surfacing the suggestion in the document further comprises surfacing:
- a preview of the suggested document,
- a key word of the suggested document,
- a title of the suggested document, or
- an author of the suggested document.

19. The system of claim 16, wherein the surfacing the suggestion in the user interface for displaying the document comprises implementing an Input Method Editor (IME).

20. The system of claim 16, wherein the surfacing the suggestion in the user interface for the document comprises adding the suggestion to the document as an attachment, the document being an electronic mail.

* * * * *